US005078438A

United States Patent [19]

Bieganski

[11] Patent Number: 5,078,438

[45] Date of Patent: Jan. 7, 1992

[54] GATE CLOSURE LATCH

[76] Inventor: Christopher Bieganski, 23921 Aspen Way, Calabasas, Calif. 91302

[21] Appl. No.: 721,411

[22] Filed: Jun. 26, 1991

[51] Int. Cl.[5] .......................... E05C 3/06; B23P 19/04

[52] U.S. Cl. .................................... 292/235; 292/209; 81/302

[58] Field of Search ............... 292/107, 152, 153, 133, 292/209, 235; 81/302, 341, 427

[56] References Cited

U.S. PATENT DOCUMENTS

| | | | |
|---|---|---|---|
| 1,074,058 | 9/1915 | Maxwell | 81/302 X |
| 1,629,379 | 5/1927 | Dudas | 292/133 |
| 2,234,715 | 3/1941 | Whitney | 81/427 X |
| 3,433,518 | 3/1969 | Foltz | 292/235 X |
| 4,280,265 | 7/1981 | Murphy | 81/302 X |

*Primary Examiner*—Richard E. Moore
*Attorney, Agent, or Firm*—Roger A. Marrs

[57] ABSTRACT

A manually operated latch for a gate closure is disclosed herein having a resilient helical coil with extended end portions secured to the ends of a pair of hand grips. The end portions are disposed to extend at an angle with respect to each other so that the normal bias of the coil forcibly urges the hand grips away from each other. A keeper loosely secured between the end portions holds the hand grips from separating beyond a predetermined set position and permits yieldable closing or drawing of the hand grips together against the expanding bias of the coil. A pair of latch members are rigidly carried on the end portions and extend towards each other in a normally biased condition to draw overlapping latch elements together.

6 Claims, 1 Drawing Sheet

GATE CLOSURE LATCH

BACKGROUND OF THE INVENTION

1. Field of the Invention

The present invention relates to the field of gate latches, and more particularly to a novel manually operated latch for a gate closure which is resiliently biased in sufficient strength to maintain the gate closure closed when the latch elements of the device are engaged with a conventional gate closure and yet permits the bias to be overridden by manual strength to release or open the gate closure.

2. Brief Description of the Prior Art

In the past, it has been the conventional practice to employ a gate closure for swinging gates which involves a stationary base secured to a gate jamb which includes an elongated bar or rod outwardly projecting that is intended to be aligned with and insertably received by a slot in a base provided along the edge of the swingable gate. This latter base further includes a pivoting latch which normally closes the slot by means of gravitational force and the latch is forced open when the bar or rod of the fixed base member on the gate jamb strikes a rounded portion on the latch to force it to pivot out of the way to permit the rod or bar to enter the bottom of the slot. Upon reaching this point, gravitational forces will permit the latch to downwardly pivot so that the latch falls behind the rod or bar while it is bottomed in the slot for releasable retention. In order to release the latch, it is the usual practice to employ a cord or wire on the top of the latch which is pulled by the user in order to operate the latch against gravity to open the slot for permitting passage of the bar or rod as the gate is swung to an open position.

Difficulties and problems have been encountered when using such a conventional latch, which stem largely from the fact that it is relatively easy to manipulate the latch so that it pivots out of engagement with the bar or rod so as to permit the gate to be opened in an easy and unrestricted manner. Although this is of great value in most instances, it is viewed as a disadvantage when small children or unauthorized persons attempt to manipulate the latch mechanism. Since there is no binding or restrictive impediment to moving of the pivoting latch, such unauthorized persons or persons with very little strength, such as children or infants, can move the latch in order to release the locking bar or rod. Some attempts have been made to prevent this by providing a retaining hole through which the hasp of a lock can be placed so as to restrict the pivoting movement of the latch. Obviously, this procedure requires the expense of the lock and maintenance of a key and the use of a key or a combination must be memorized. Also, the lock is not attached to the gate or jamb so that it is easily lost or misplaced. It is generally only used when it is desired to maintain the gate closed and locked for a period of time.

Therefore, there has been a long-standing need to provide a manual latching means for use in connection with a conventional gate closure which can readily be opened and closed by an adult having sufficient strength to overcome a spring bias whereas the latching device cannot be operated by youngsters or children who lack the physical strength to operate the device. Such a means is inexpensive and uncomplicated so that it does not require special instruction nor special installation.

SUMMARY OF THE INVENTION

Accordingly, the above problems and difficulties are obviated by the present invention which provides a novel latch means for releasably retaining a conventional gate latch or closure in its closed or latched condition. In one form of the invention, a helical coil spring having outwardly diverging end portions is provided wherein hand grips are secured to the end portions in such a manner that the resilient bias of the coil spring tends to urge the hand grips away from each other. A keeper means is loosely coupled to the end portions of the helical spring so as to limit the outwardly diverging bias of the spring. Latch members are carried on the respective end portions which extend away from the hand grips and beyond the resilient coil to terminate in latch elements that overlap one another in response to the normal expanding bias of the coil and the end portions. The keeper means permits closure of the hand grips in response to the user's grasping of the hand grips and forcibly urging the grips together against the expansion bias of the coil whereby the latch elements separate and permit installation of the latch elements through the hole or opening of a conventional gate latch mechanism.

Therefore, it is among the primary objects of the present invention to provide a novel gate closure latch means which is manually operated and requires physical strength to open the latch mechanism in order to release the gate closure.

Another object of the present invention is to provide a manually operated latch having a closed position and an open position whereby a helical coil normally forces the latch into a closed position which may be overridden or overcome by exertion of physical force to an open position.

Yet another object of the present invention is to provide a novel gate closure mechanism having a retaining hole for rendering the latch inoperative and which further includes a pair of resiliently biased latch elements carried on the ends of hand grips intended to be insertably received through the retaining hole and which may be yieldably overcome to separate the latch elements for removal from the retaining hole.

Still a further object of the present invention is to provide an inexpensive and convenient hand operated means for inserting and removing a retaining latch for a conventional gate closure.

BRIEF DESCRIPTION OF THE DRAWINGS

The features of the present invention which are believed to be novel are set forth with particularity in the appended claims. The present invention, both as to its organization and manner of operation, together with further objects and advantages thereof, may best be understood with reference to the following description, taken in connection with the accompanying drawings in which:

DESCRIPTION OF THE PREFERRED EMBODIMENT

Figure 1:
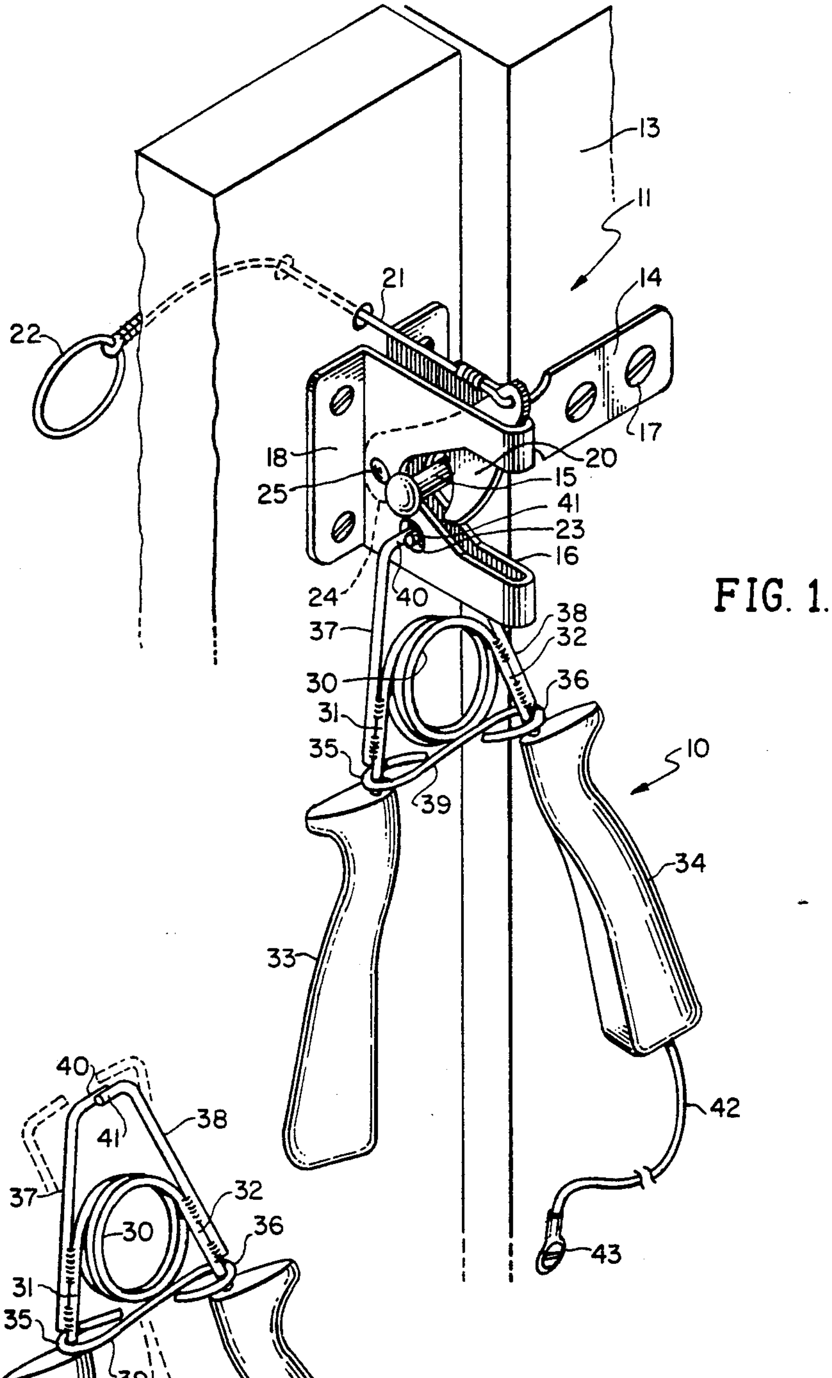
FIG. 1 is a front perspective view showing a conventional gate closure assembly and which portrays the novel gate closure latch incorporating the present invention; and FIG. a view similar to the view of FIG. 1 showing the gate closure latch of the present invention in its biased closed position in solid lines and in its yieldable open condition in broken lines.

Referring to FIG. 1, the novel gate closure latch of the present invention is illustrated in the general direction of arrow 10 which is used to temporarily close a conventional latch assembly, illustrated in the direction of arrow 11, that retains a swinging gate 12 in a closed position with respect to a door jamb 13. The conventional gate closure includes a fixed base 14 having an outwardly projecting bar or rod 15 that is insertably received through an open-ended slot broadly identified by numeral 16. The base 14 is fixedly secured to the jamb 13 by screws or other retainers, such as indicated by numeral 17, and the bar or rod 15 is aligned with the slot 16 so that the bar or rod enters the slot and proceeds to the bottom of the slot so as to rest against a base 18 which is secured to the edge of the gate 12. When the rod or bar 15 is so disposed, a pivoting latch 20 falls under the force of gravity behind the rod or bar 15 to close the opening into the slot and thereby retain the bar or rod in a closed or retained position. In order to release the latch 20, a pull string or wire 21 is provided and the user may grasp the ring 22 attached at one end so that upon exertion of a pull, the latch 20 will pivot upwardly for release of the rod or bar 15. As illustrated in FIG. 1, the manually operated latch 10 is in position through a retaining hole 23 to prevent an ear 24 carried on the latch 20 from proceeding past the hole in order to prevent the latch 20 from pivoting about pivot point 25. In order to remove the latch 20 from its retaining position as shown in FIG. 1, the latch must be pivoted counterclockwise about pivot 25 so that the dog ear 24 can move into the slot 16 while the latch 20 moves upwardly and out of the slot, permitting release of the bar or rod 15. By placing the latch 10 through the retention opening 23, the dog ear 24 cannot proceed into the slot 16 and the latch 20 cannot be pivoted counterclockwise.

In one form of the invention, the latch of the present invention includes a helical spring 30 having opposite end portions 31 and 32 which outwardly diverge from the coil 30 and which are respectively fastened to hand grips 33 and 34. The outward expansion or extension of the end portions 31 and 32 are restricted by a keeper 34 having end loops 35 and 36 that are provided or encircled about the respective end portions 31 and 32. However, the end portions are permitted to be contracted towards one another since the openings in the central area of the loops 35 and 36 are oblong.

It is also to be noted that each of the end portions 31 and 32 carries upwardly extending latch members 37 and 38 which terminate in cantilevered overlapping latch elements 40 and 41 respectively. The latch elements 40 and 41 are normally biased to the overlapped position by the coil spring 30 and this bias is yieldable for separating the latch elements when end pressure is applied to the grips 33 and 34. Furthermore, in order to maintain the latch 10 in close proximity to the gate closure 11, a tether cord 42 is provided, having one end secured to hand grip 34 and its opposite end secured to the stationary gate jamb by means of a fastener 43.

Figure 2:
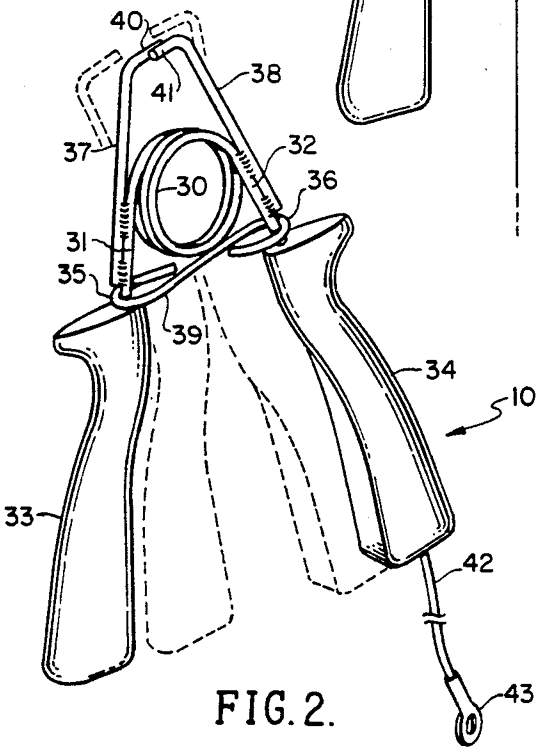

Referring now, in general to FIG. 2, it can be seen that the closure or latch elements 40 and 41 are in their closed or overlapped position, as shown in solid lines. However, when the bias of the spring is overcome, such as by the user grasping the hand grips 33 and 34 and depressing the grips toward one another to the position shown in broken lines, the latch elements 40 and 41 are separated, as shown in broken lines. By separating the latch elements, a gap is provided so that the device may be slipped over the forward protrusion of the base 18 in or out of the retention opening 23.

In view of the foregoing, it can be seen that the novel hand-operated latch of the present invention provides a novel means for releasably retaining the pivoting latch 20 in its retention position about the rod or bar 15. Only when sufficient strength is applied to the hand grips 33 and 34 can the bias and tension of the coil spring 30 be overcome so that the latch elements 40 and 41 can be separated. A child will not have sufficient strength to overcome this tension. Also, unauthorized persons would have difficulty in operating the hand grips since the hand grips are in a downwardly depending position and one outside the gate would have difficulty in reaching over and applying sufficient pressure to bring the hand grips together. Such a maneuver would be extremely awkward and would confuse such an unauthorized person from gaining entry. The latch device 10 is of simple construction and does not require special tools, instruction or installation. The novel latch may be used with gate closures that have been previously installed. The tension of the hand grips can be adjusted by providing longer or shorter keepers 39.

While particular embodiments of the present invention have been shown and described, it will be ious to those skilled in the art that changes and modifications may be made without departing from this invention in its broader aspects and, therefore, the aim in the appended claims is to cover all such changes and modifications as fall within the true spirit and scope of this invention.

What is claimed is:

1. A manual latch for a gate closure comprising the combination of:

a resilient means having a pair of end portions outwardly extending from a central coil in diverging relationship normally biased to expand away from each other;

a pair of latch members carried on said end portions projecting beyond said central coil in opposite direction from said end portions so as to be normally biased towards each other;

said latch members terminating in cantilevered latch elements that overlap when in said normally biased position;

a hand grip secured to each of said resilient means end portions adapted to be squeezed against said normally biased position to separate said overlapped latch elements; and a keeper interconnecting said resilient means end portions to limit biased divergence thereof.

2. The invention as defined in claim 1 wherein said central coil consists of a wire coil with said end portions being integral therewith.

3. The invention as defined in claim 2 wherein:

said latch elements are linear segments lying side-by-side in a closed condition in response to said normal bias position of said end portions.

4. The invention as defined in claim 3 wherein:

said keeper includes a pair of elongated loops on opposite ends thereof, each loop encircling a respective one of said end portions.

5. The invention as defined in claim 4 wherein:

said latch elements separate to provide a gap between said latch elements in response to squeezing said hand grips together against the expansion bias of said resilient means end portions.

6. The invention as defined in claim 5 including:

an elongated, flexible tether attached at one end to a selected one of said hand grips and the opposite ends having a fastener carried thereon.

* * * * *